United States Patent [19]

Iimura

[11] Patent Number: 5,216,660
[45] Date of Patent: Jun. 1, 1993

[54] METHOD OF OPTIMALLY CONTROLLING THE POWER OF A RECORDING LASER BEAM

[75] Inventor: Shinichiro Iimura, Tokyo, Japan

[73] Assignee: Sony Corporation, Tokyo, Japan

[21] Appl. No.: 686,775

[22] Filed: Apr. 17, 1991

[30] Foreign Application Priority Data

Apr. 26, 1990 [JP] Japan .................................. 2-108755

[51] Int. Cl.$^5$ .......................................... G11B 7/00
[52] U.S. Cl. ...................................... 369/116; 369/54
[58] Field of Search ............... 369/116, 112, 124, 106, 369/54, 58, 32

[56] References Cited

U.S. PATENT DOCUMENTS

| 4,283,785 | 8/1981 | Miyauchi et al. | 369/116 |
| 4,685,097 | 8/1987 | van der Put | 369/116 |
| 4,701,609 | 10/1987 | Koishi et al. | 369/116 |
| 4,788,674 | 11/1988 | Maeda et al. | 369/116 |
| 4,949,311 | 8/1990 | Barnard | 369/116 |
| 4,967,284 | 10/1990 | Yoshida et al. | 358/300 |
| 5,043,971 | 8/1991 | Van et al. | 369/116 |

FOREIGN PATENT DOCUMENTS

0109130(A2) 5/1984 European Pat. Off. .
61-122932(A) 6/1986 Japan .
2148427 6/1990 Japan .

*Primary Examiner*—Aristotelis Psitos
*Assistant Examiner*—Nabil Hindi
*Attorney, Agent, or Firm*—Philip M. Shaw, Jr.

[57] ABSTRACT

This invention is directed to a method comprising the steps of detecting the intensity of a return laser beam from an optical recording medium of a recording laser beam for forming pits onto the optical recording medium at the time of a recording mode to record information thereon, and controlling a power of the recording laser beam on the basis of a ratio between a detected output of the intensity of a return laser beam within a predetermined time required until pits are actually formed on the optical recording medium and a detected output of the intensity of a return laser beam within a time period during which pits are actually formed, whereby even if the relationship between the recording laser power and pits formed varies due to characteristic unevenness, skew (inclination), or temperature of the medium, etc., this method permits formation of pits in a fixed reasonable dimension to carry out an optimum information recording.

7 Claims, 4 Drawing Sheets

METHOD OF OPTIMALLY CONTROLLING THE POWER OF A RECORDING LASER BEAM

BACKGROUND OF THE INVENTION

1. Field of the Invention

This invention relates to a method of controlling a recording laser beam for recording information onto an optical recording medium.

2. Description of the Prior Art

In recent years, disc-shaped recording media such as optical discs or photomagnetic discs, etc. utilizing the optical or magneto-optical signal recording/playback method are being developed and delivered to the market. For such disc-shaped recording media, there are known a recording medium of the read only memory (ROM) type such as so called a compact disc (CD), etc., a recording medium of so called a write once type onto which data can be once written on the user side, a recording medium which can rewrite (overwrite) data such as a photomagnetic disc, etc., and the like.

In the optical disc recording/playback apparatuses adapted to implement writing or reading of data on write once type or overwritable optical discs, the optical disc is rotated at a fixed angular velocity or a fixed linear velocity by the spindle servo and focus servo and/or tracking servo are applied to the optical head. The optical head includes a laser diode driven by the laser drive circuit to output a laser beam for recording/playback of information, a photodetector for detecting a reflected light of the laser beam irradiated onto the optical disc, and the like. On the basis of a detected output by the photodetector the optical head scans recording tracks of the optical disc and uses the laser beam to carry out recording/playback of information.

Further, in the optical disc recording/playback apparatuses adapted to scan recording tracks by using a laser beam to carry out recording/playback of information in a manner stated above, there is the possibility that if the beam power of a laser beam scanning the recording tracks is too small at the time of the recording mode, information may not be securely recorded, and if the beam power of a laser beam scanning recording tracks is too large at the time of playback mode, a serious effect or influence such as destruction is exerted on information recorded on the recording tracks. For this reason, as in the apparatus disclosed in, e.g., the Japanese Patent Laid Open No. 46633/78, a technique is employed to carry out switching of a so called APC servo loop in dependency upon various operational modes, which is adapted to detect the intensity of a laser beam for recording/playback of information, i.e., light quantity to carry out a feedback control of the drive circuit for the laser diode outputting a laser beam to keep constant the beam power of the laser beam, thus to suitably carry out switching of the beam power.

In the conventional laser beam power control as described above, since only a control of a fixed, predetermined laser output is provided, the following problems occur. Namely, an optimum laser output for permitting recording in a reasonable pit form varies (1) by unevenness of characteristics between media, (2) by the spatial positional (inclined angular) relationship with respect to the optical system by skew (inclination), etc. of the medium, and (3) by changes in the recording characteristic of the medium due to temperature changes. For this reason, even if an approach is only employed to keep the laser output constant, formation of pits of an optimum dimension is not necessarily carried out.

SUMMARY OF THE INVENTION

With the actual circumstances of the prior art as described above in view, an object of this invention is to provide a method of controlling a recording laser beam capable of coping with inconveniences such that the optimum value of the recording laser output varies in dependency upon the characteristic unevenness, skew, temperature changes of the medium, or the like.

To solve the above-described problems, a method of controlling a recording laser beam according to this invention forming pits, corresponding to an information signal to be recorded, onto an optical recording medium at the time of a recording mode, detecting the intensity of a return laser beam from the recording medium of the recording laser beam, and, controlling a power of the recording laser beam on the basis of a ratio between a detected output, represented by VA, of the intensity of a return laser beam within a predetermined time required until pits are actually formed on the recording medium by the recording laser beam and a detected output, represented by VB, of the intensity of a return laser beam within a time period during which pits are actually formed on the recording medium so that a value $(VA-VB)/VA$ is kept constant.

In accordance with a method of controlling a recording laser beam according to this invention, there is employed an approach to detect the intensity of a return laser beam of a recording laser beam irradiated onto an optical recording medium to control the power of the recording laser beam on the basis of a ratio between a detected output of the intensity of a return beam within a time required until pits are actually formed on the optical recording medium by the recording laser beam and a detected output of the intensity of a return laser beam within a time period during which pits are actually formed. Accordingly, even if an optimum recording laser power varies in dependency upon various conditions of the recording medium, e.g., unevenness of the recording characteristics between media, skew (inclination) of the medium, or the medium temperature, etc., power control is conducted so that each dimension of the pits themselves formed is optimum. Thus, an optimum recording is carried out irrespective of the above-mentioned changes of the conditions.

DESCRIPTION OF THE PREFERRED EMBODIMENTS

Figure 1:
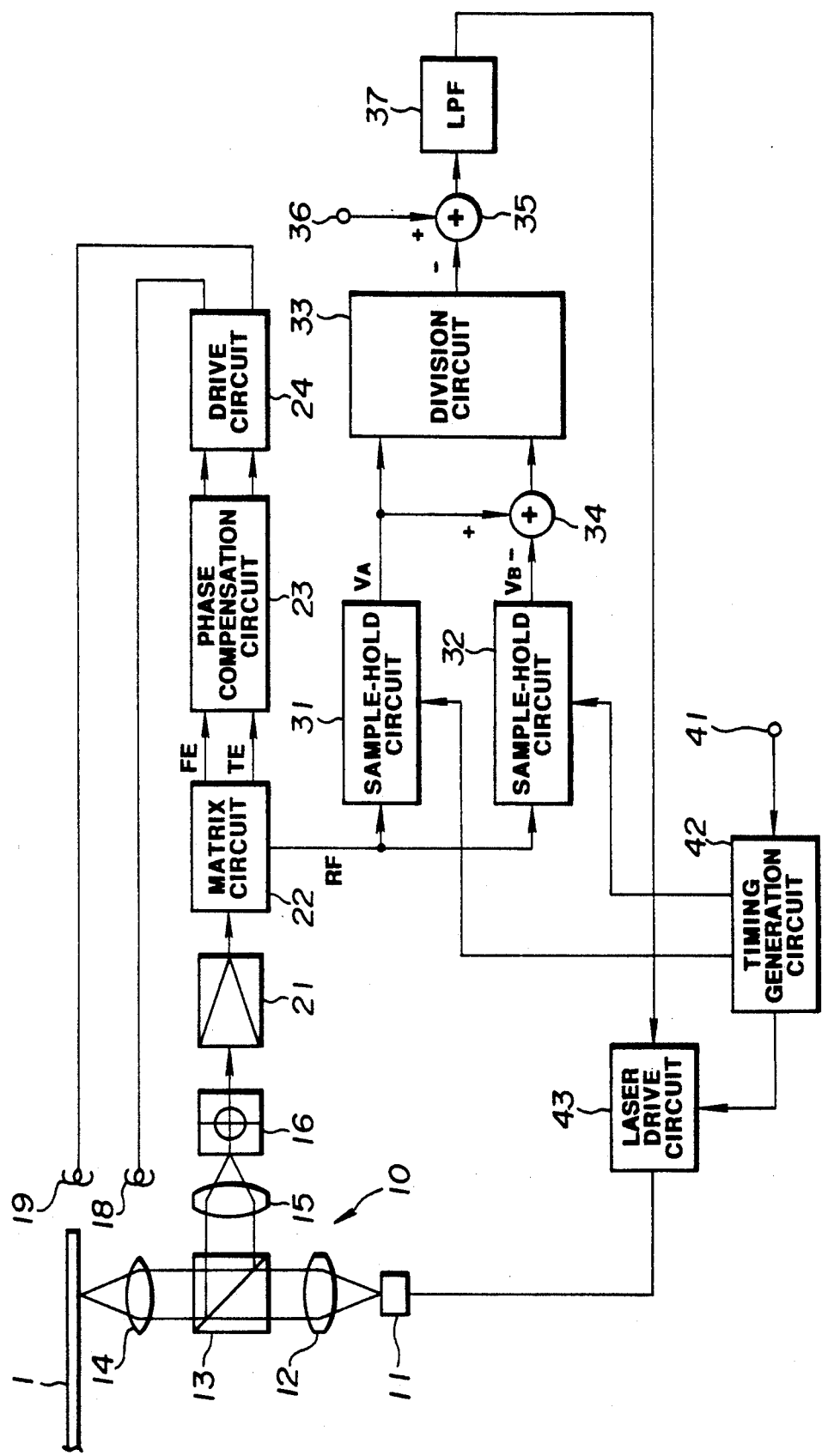
FIG. 1 is a block diagram showing the outline of the configuration of a recording/playback system of an optical disc recording/playback apparatus to which this invention is applied.

An embodiment of this invention will now be described in detail with reference to the attached drawings. FIG. 1 is a block diagram showing the configuration of a recording/playback system in the case where this invention is applied to an optical disc recording/playback apparatus to rotationally drive, by using a spindle motor, an optical disc 1 formed by an optical recording medium of the write once type to allow a laser beam to scan recording tracks on the optical disc 1 by using an optical head optical system 10 to thereby optically carry out recording and playback of digital data of a predetermined data format.

In the optical head optical system 10 of this optical disc recording/playback apparatus, a laser beam from a laser diode 11 serving as a laser light source is changed to a parallel light beam by means of a collimator lens 12. The parallel light beam thus obtained is projected so that it is converged onto the signal recording surface on the optical disc 1 through a beam splitter 13 and through an objective lens 14. A reflected light beam (return laser beam) of a laser beam projected and reflected on the signal recording surface of the optical disc 1 is reflected by the beam splitter 13, and is guided to a photodetector 16 serving as a light receiving element through a cylindrical lens 15. Here, the objective lens 14 is subjected to movement control in an optical axis direction and in a direction perpendicular to the optical axis by means of so called a biaxial drive unit comprised of drive coils 18 and 19.

The photodetector 16 is, e.g., of a structure in which the light receiving section is quadrisected. Light detection signals from these respective light receiving sections are delivered to a matrix circuit 22 through an amplifier 21, at which the sum of these signals and/or difference therebetween are provided. Thus, these signals are taken out as a so called a playback RF signal, a focus error signal, and a tracking error signal, etc. The focus error signal and the tracking error signal are delivered to the driving coils 18 and 19 of the biaxial drive unit through a phase compensation circuit 23 and through a servo drive circuit 24, respectively. Thus, the focus servo and the tracking servo are carried out. The above-mentioned playback RF signal is a sum signal of the output signals from the respective light receiving sections. This playback RF signal is delivered to two sample-hold circuits 31 and 32 for carrying out sampling at two timings different from each other as described later.

Figure 2:
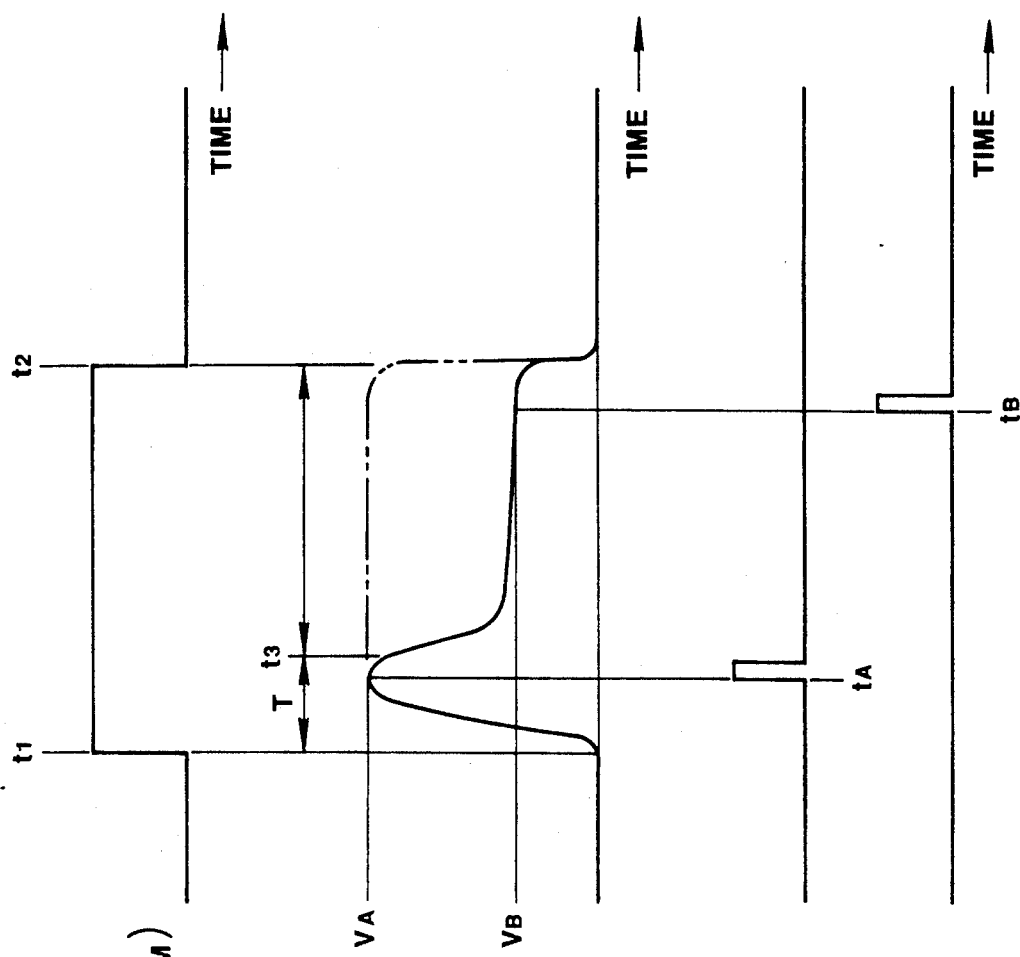
FIGS. 2A to 2D are time charts for explaining the operation in the case of forming pits on the optical disc by a recording laser beam.

To a recording signal input terminal 41, e.g., EFM (8-14 modulation) signal of information to be recorded is delivered. This recording signal is a pulse signal as shown in FIG. 2A of binary data. When that recording signal is delivered to a laser drive circuit 43 through a timing generation circuit 42, the laser diode 11 is subjected to emitting drive only for a time period during which the recording signal is at, e.g., "H" (high level) of FIG. 2A. As a result, a recording laser beam is irradiated toward the signal recording surface of the disc 1.

The changes in the intensity of a return laser beam are shown in FIG. 2B with respect to a recording laser beam (FIG. 2A) from the laser diode 11. For a time period from the time t1 to t2 of FIG. 2A, a recording laser beam is outputted. Practically, however, there exists a time delay of about 300 to 400 ns until the formation of pits is actually started from the time when laser irradiation onto the disc recording surface is initiated. Assuming now that this pit formation start time is represented by t3, the time period from the time t3 to the time t2 indicates the time period during which pits are formed. For this reason, the intensity of the return laser beam varies as follows. For a time period from the time t1 to t3 during which no pit is formed, the laser beam intensity is large because the reflectivity of the recording surface is high. In contrast, for a time period from the time t3 to t2 during which pits are formed, there occurs diffraction and/or interference of a reflected light by pits formed, so the return laser beam intensity becomes small. Here, the absolute value of the return laser beam intensity varies in dependency upon the unevenness of the recording characteristic of the optical disc 1 serving as a medium, skew (inclination) of the disc, or changes in the recording characteristic corresponding to an ambient temperature. The ratio between the return laser beam intensities in the respective time regions (the time period from the time t1 to t3 and the time period from the time t3 to t2) is determined in dependency upon how pits are formed. The ratio when recording is carried out, e.g., in an optimum form takes a predetermined value. In a more practical sense, when light intensity (light quantity) for the time period from the time t1 to t3 is assumed as VA, and light intensity (light quantity) for the time period from the time t3 to t2 is assumed as VB, the modulation factor of pits formed can be expressed as follows:

$$(VA-VB)/VA \qquad (1)$$

The modulation factor in the case where an optimum recording is conducted indicates a fixed value. Here, the phantom lines (double dotted lines) of FIG. 2B indicates a curve of the modulation factor 1 in the case where no pit is formed. By drawing attention to the above-mentioned point to carry out a laser power control so that the modulation factor is maintained at a fixed value, an optimum recording can be carried out irrespective of various conditions of the medium.

Turning to FIG. 1 for a second time, in the respective sample-hold circuits 31 and 32, in order to detect a return laser beam intensity in the respective time regions (the time period from the time t1 to t3 and the time period from the time t3 to t2), in dependency upon respective sampling pulses from the timing generation circuit 42, sampling operations are carried out at a predetermined time tA for the time period from the time t1 to t3, and a predetermined time tB for the time period from the time t3 to t2. This timing generation circuit 42 outputs respective pulses at timings as shown in FIGS. 2C and 2D in dependency upon an inputted recording signal as shown in FIG. 2A. Namely, FIG. 2C indicates a sampling pulse delivered to the sample-hold circuit 31 and for carrying out sampling at the timing of the time tA. This sampling pulse samples a playback RF signal output at the time the return light intensity for the time period from the time t1 to t3 during which no pit is formed becomes maximum. Further, FIG. 2D indicates a sampling pulse delivered to the sample-hold circuit 32 and for carrying out sampling at the timing of the time tB. This sampling pulse samples a playback RF output at the time pits are completely formed, so the return optical intensity becomes stable for the time period from the time t3 to t2 during which the above-mentioned pits are formed. An output (light quantity VA) from the sample-hold circuit 31 is delivered to the division circuit 33. Further, an output (light quantity VB) from the sample-hold circuit 32 is subtracted from an output (light quantity VA) from the sample-hold circuit 31 at the subtracter 34. The output VA-VB thus obtained is delivered to the division circuit 33. At the division circuit 33, divisional operation expressed by the above-mentioned equation 1 is carried out. Thus, a modulation factor is determined. A modulation factor output from the division circuit 33 is subtracted from a reference value from the terminal 36 at a subtracter 35. Thus, an error is taken out as a control signal for the recording laser power through a low pass filter (LPF) 37, and is delivered to a laser drive circuit 43.

Figure 3:
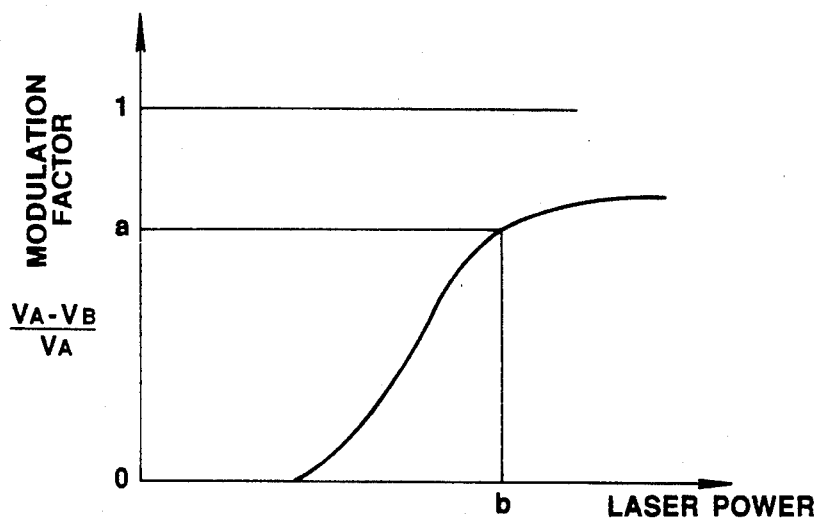
FIG. 3 is a graph showing the recording characteristic of the optical disc.

FIG. 3 shows a modulation factor (ordinate) of the above-mentioned equation 1 with respect to the power (abscissa) of the recording laser beam as the recording characteristic of the optical disc 1 serving as a recording medium. By controlling the recording laser power so that the modulation factor becomes the optimum value a thereof, the optimum recording as described above can be carried out. In the example of FIG. 3, the recording laser power when the modulation factor becomes equal to the optimum value (reference value) a is represented by b. However, the recording characteristic curve itself varies in dependency upon various conditions of the medium, e.g., unevenness between media, skew (inclination) of the medium, or the medium temperature, etc. Accordingly, by simply implementing stabilization control to the recording laser power so that the recording laser power becomes equal to b, an optimum recording is not carried out. However, by carrying out the power control so that the modulation factor becomes equal to the optimum reference value a, each dimension of pits formed becomes optimum. Thus, an optimum recording is carried out.

Figure 4:
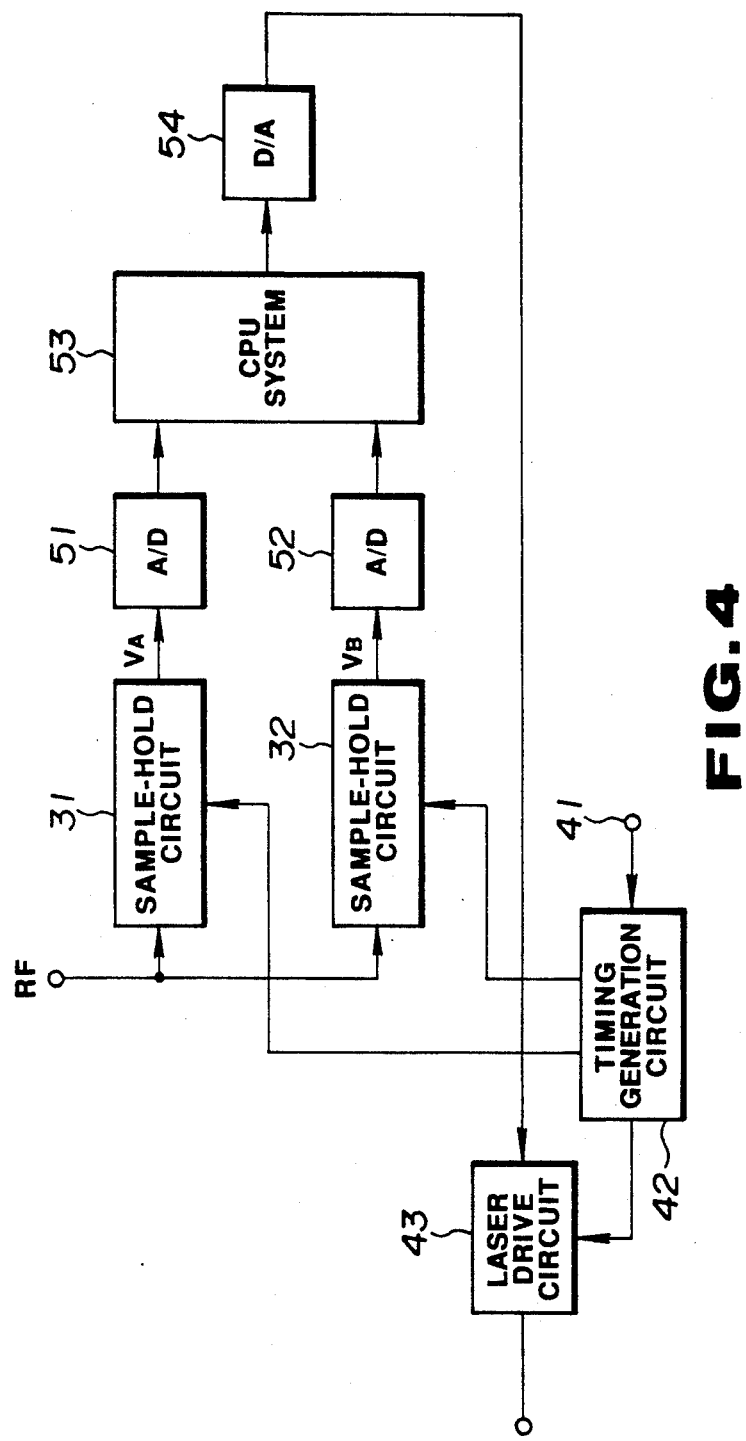
FIG. 4 is a block diagram showing the configuration of the essential part of another embodiment of an optical disc recording/playback apparatus to which this invention is applied.

Meanwhile, in actual disc recording apparatuses, the above-mentioned power control is realized by the method based on software using a so called CPU. The essential configuration of an example thereof is shown in FIG. 4. In FIG. 4, output signals from the sample-hold circuits 31 and 32 of FIG. 1 are delivered to A/D converters 51 and 52, respectively, at which they are converted to digital data. By the CPU system 53, divisional processing at the divisional circuit 33 and/or subtractive processing at the subtracters 34 and 35 are carried out. The processing by the LPF 37 is carried out in a digital form and the processed result thus obtained is outputted therefrom. A digital output from the CPU system 53 is converted to an analog signal at the D/A converter 54, resulting in a power control signal for the recording laser beam. The power control signal thus obtained is delivered to the laser drive circuit 43. Since other components and operations are the same as those of the above-described example of FIG. 1, their illustration and explanation are omitted. In accordance with the embodiment of this invention as described above, even if there exists unevenness in the optimum recording laser outputs for respective optical discs 1 serving as the recording medium, an optimum recording can be carried out at all times. Further, the control method according to this embodiment can follow changes in the optimum recording laser output due to skew (inclination), etc. of the disc 1, and can further follow changes in the optimum recording laser output due to the temperature change of the optical disc 1.

Although the present invention has been shown and described with respect to preferred embodiments, various changes and modifications which are obvious to a person skilled in the art to which the invention pertains are deemed to lie within the spirit and scope of the invention.

What is claimed is:

1. A method of controlling a recording laser beam, comprising the steps of:

irradiating a recording laser beam for forming pits, corresponding to an information signal to be recorded, onto an optical recording medium at the time of a recording mode, detecting the intensity of a return laser beam from said recording medium of said recording laser beam, and, controlling a power of said recording laser beam on the basis of a ratio between a detected output, represented by VA, of the intensity of a return laser beam within a predetermined time required until pits are actually formed on said recording medium by said recording laser beam and a detected output, represented by VB, of the intensity of a return laser beam within a time period during which pits are actually formed on said recording medium so that a value (VA−VB)/VA is kept constant.

2. A method of controlling a recording laser beam as set forth in claim 1, wherein the power of said recording laser beam is controlled on the basis of a ratio between a value provided by sampling detected outputs of the intensities of return laser beams within a predetermined time required until pits are actually formed on said recording medium and a value provided by sampling detected outputs of the intensities of return laser beams within a time period during which pits are actually formed on said recording medium.

3. An optical recorder comprising:

a laser light source adapted to irradiate a recording laser beam for recording an information signal onto a optical recording medium, detector means for detecting a return laser beam from said recording medium of a recording beam irradiated from said laser light source onto said recording medium, and control means for determining a ratio between a detected output, represented by VA, from said detector means which has detected the intensity of the return laser beam within a predetermined time required until pits based on said information signal are formed on said recording medium and a detected output, represnted by VB, from said detector means which has detected the intensity of the return laser beam within a time period during which pits are actually formed on said recording medium to thereby control the output of said laser light source so that a value of (VA−VB)/VA is kept constant.

4. An optical recorder as set forth in claim 3, wherein said control means comprises sampling means for sampling detected outputs from said detector means, and timing signal generator means operative to generate a timing signal for allowing said sampling means to perform a sampling operation within a predetermined time until pits based on said information signal are formed on said recording medium by said recording beam, and within a time period during which pits are actually formed on said recording medium.

5. An optical recorder as set forth in claim 4, wherein said control means comprises converter means for converting an output signal from said sampling means to digital data, and computational processing means operative to provide a computational output of a control signal for controlling said laser light source on the basis of digital data from said converter means.

6. An optical recorder comprising:

a laser light source adapted to irradiate a recording laser beam for recording an information signal onto a optical recording medium, detector means for detecting a return laser beam from said recording medium of a recording beam irradiated from said laser light source onto said recording medium, and control means for determining a ratio between a detected output from said detector means which has detected the intensity of the return laser beam within a predetermined time required until pits based on said information signal are formed on said recording medium and a detected output from said detector means which has detected the intensity of the return laser beam within a time period during which pits are actually formed on said recording medium to thereby control the output of said laser light source, wherein said control means comprises sampling means for sampling detected outputs from said detector means, and timing signal generator means operative to generate a timing signal for allowing said sampling means to perform a sampling operation within a predetermined time until pits based on said information signal are formed on said recording medium by said recording beam, and within a time period during which pits are actually formed on said recording medium.

7. An optical recorder as set forth in claim 6, wherein said control means comprises converter means for converting an output signal from said sampling means to digital data, and computational processing means operative to provide a computational output of a control signal for controlling said laser light source on the basis of digital data from said converter means.

* * * * *